United States Patent Office 3,075,880
Patented Jan. 29, 1963

3,075,880
BONE AND TISSUE REPAIR
Lester Hugh Roth, 3401 5th Ave., Pittsburgh 13, Pa.
No Drawing. Filed Mar. 29, 1961, Ser. No. 99,070
6 Claims. (Cl. 167—65)

This invention relates to means for and a method of effecting a variety of medical, dental and veterinary results in the healing and repair of damage to bones and teeth, and in the healing of soft tissues, and it is among the major objects of this invention to provide for the treatment of cuts and wounds, and other traumatic consequences, especially those resulting from surgical procedures, for topical coagulation and absorption of blood, to accelerate tissue healing, for treatment of pathological conditions such as abscesses, and among other things to assist in or accomplish osteogenic processes, both in bone and also in teeth, for example.

The objects of the invention are accomplished by compositions of synthetic basic calcium phosphate (BCP) and at least one agent of the group consisting of the tetracycline family antibiotics and the corticosteroids.

The BCP used in the practice of the invention is a synthetic one that exhibits the X-ray difraction pattern of calcium hydroxyapatite $[Ca_3(PO_4)_2 \cdot \frac{1}{3}Ca(OH)_2]$. Preferably there is used a synthetic BCP supplied by Baugh and Sons Company, of Baltimore, Maryland, having the following characteristics: When dried at 100°–110° C. it contains not less than 85% or more than 90% of CaO plus $P_2O_5$ and the weight ratio of CaO to $P_2O_5$ is not less than 1.3:1 or more than 1.4:1. Its solubility in distilled water at 25° C., determined as sulfated ash, is not less than 2 or more than 5 milligrams per 100 cc. of saturated solution. After degassing for 1 hour at 200° C., its total pore volume is not less than 0.35 or more than 0.45 cc./g.; its surface area, as determined by the method of Brunauer, Emmett and Teller (J. Am. Chem. Soc., 60, 309 (1938)), is not less than 90 or more than 120 m.$^2$/g., and a curve showing its distribution of pore volume with respect to pore radius, constructed by the method of Barrett, Joyner and Halenda (J. Am. Chem. Soc., 73, 373 (1951)), exhibits a sharp maximum in the range of 40–60 Angstroms. Ignition of the dry substance at 650° C. for one hour results in the loss of 4 to 6 percent of volatile material, principally water. The dry basis fluoride content (as F) is in the range of 0.05% to 0.1%).

According to the results sought, the BCP is sterilized and is intimately mixed with at least one tetracycline antibiotic. Thus, lesions, such as cuts, wounds, or surgical surfaces, may be treated with a mixture of BCP and chlorotetracycline that may be applied as a dusting powder or as surgical gauze impregnated (e.g., adhesive bandages and catamenial devices) with such a powder or with a suspension of the composition in water, oils, or such inert water-insoluble liquids as the dimethylsiloxane fluids. Such compositions are useful also in the treatment of abscessed tooth sockets. For all such purposes the compositions act to promote healing of tissue and capillary vessels, and to reduce loss of blood. They supply Ca ion as is desirable for such purposes.

As evidencing one application of the invention, abscessed tooth sockets packed with a mixture of BCP and an antibiotic have shown desirable response, even to the naked eye faster, even in 24 hours, than is caused by the same antibiotic supplied in other media, without BCP. Likewise, sockets can be packed following apiectomy with BCP and an antibiotic. Radiography after 24 hours of sockets treated in this way shows healing such as would otherwise result only after several weeks.

The calcium ion supplied by BCP is effective also in bone and tooth repair, and for such purposes the invention contemplates compositions of BCP and corticosteroids with, for many purposes, an antibiotic. Such compositions may be used following craniotomies and for application to fractured bone surfaces with benefit in causing knitting and acceleration of its completion. Such compositions are useful also in the treatment of osteomyelitis. For example, a section 4 x 10 mm. was removed from the skull of a monkey and replaced by a BCP-corticosteroid-antibiotic composition according to the invention. The monkey made an uneventful recovery, and was normal eight months later, showing no brain injury. The opening had closed due, apparently, to knitting of BCP to the cut bone surface.

In a case of pathological dental alveolar fracture due to advanced abnormal osteoporosis the teeth were extracted and the sockets packed with BCP, Acromycin and Prednisolone. A full denture was applied immediately. There were no untoward reactions, and there was complete, uneventful healing. Such cases generally require hospitalization.

In such cases the corticosteroid aids in reducing trauma due to injury by grinding, cutting, fracture, etc., with injury to the osteoblast.

Another use for the compositions of this invention is to treat the pulp in the capping of teeth, especially in the case of an exposed nerve, to exert fibroblastic activity in the building up of secondary dentine. Calcium hydroxide has been used for this purpose. These BCP compositions are better, however, because the BCP used is essentially bone.

These compositions may be used also in the treatment of wounds not only to supply antibiotic activity but also to cause blood and serum coagulation and absorption. Suitably this is done by means of adhesive bandages or other forms of surgical gauze carrying the composition, as indicated above.

The particular antibiotic used in the practice of the invention will be selected according to the desired activity. Thus, chlorotetracycline (Aureomycin) is especially active against both gram-positive and gram-negative bacteria. Other members of the tetracycline family (e.g., Acromycin, Terramycin) may, of course, be used, as well as other antibiotics, of which a number are available, to supply particular characteristics, at the discretion of the formulator and for particular actions.

A basic, or particular use of the present invention is the action of corticosteroids upon synovial fluids for the compositions exert local prolonged action and anti-inflammatory effects. For this purpose cortisone acetate (11-dehydro-17-hydroxy-corticosteroid-21-acetate) is especially desirable. Other corticosteroids that may be used include, among others known, hydrocortisone, prednisone, prednisolone, triamcinolone, methylprednisolone, alpha-dexamethasone, ACTH, and androgens.

As will be recognized, all of the uses indicated involve healing either of bone or teeth, or of soft tissues.

In the practice of the invention the BCP is sterilized, most suitably by heat, and mixed with the antibiotic or corticosteroid, or both. Powders for dusting or packing cavities or treating gauze may be prepared, or for packing cavities, such as tooth sockets, a paste may be worked up from those ingredients with sterile water or inert, sterile fluids such as the dimethylsiloxane fluids alluded to above (sold as 200 Fluids by the Dow Corning Corp.).

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. In a method of healing bone or soft tissue, the step of applying to the site to be healed a combination of synthetic hydroxyapatite, an antibiotic, and a corticosteroid.

2. A method according to claim 1, said hydroxyapatite having a weight ratio of CaO to $P_2O_5$ from 1.3 to 1.4.

3. A method according to claim 1, said antibiotic being a member of the tetracycline family.

4. As a new composition of matter, a mixture of synthetic hydroxyapatite, an antibiotic, and a corticosteroid.

5. A composition according to claim 4, said hydroxyapatite having a weight ratio of CaO to $P_2O_5$ from 1.3 to 1.4.

6. A composition according to claim 4, said antibiotic being a member of the tetracycline family.

References Cited in the file of this patent

UNITED STATES PATENTS 130,908   Fell ------------------ Aug. 27, 1872

OTHER REFERENCES

Wilson: American Drug Index, 1960, page 191.
Caglioti: Chem. Abs., vol. 31, 1937, 7501(1).